Patented Dec. 4, 1951

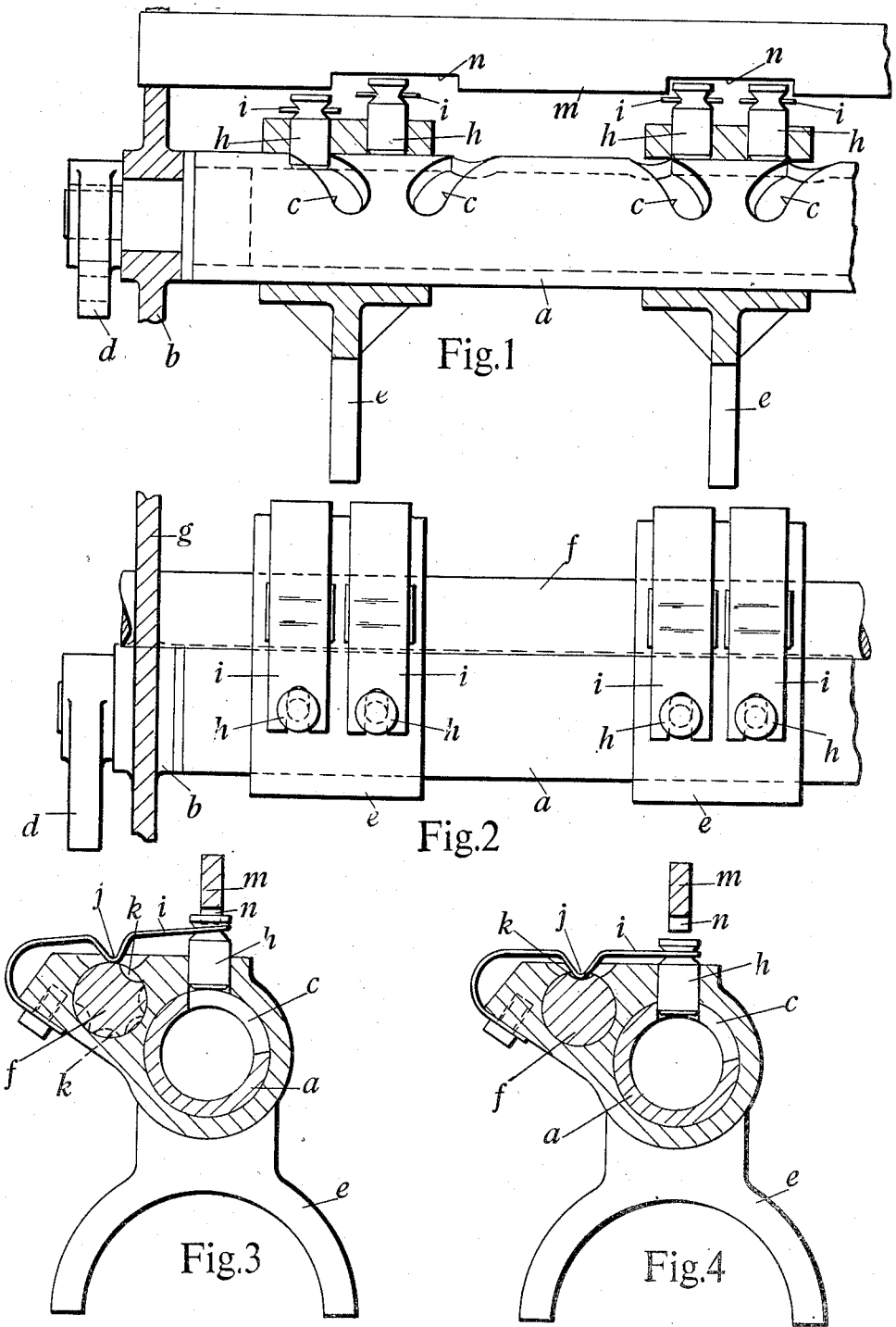

2,577,019

UNITED STATES PATENT OFFICE 2,577,019

CONTROL MECHANISM FOR VARIABLE-SPEED GEARS OR OTHER PURPOSES

Henry Martin Kesterton, Wroxall, England

Application July 22, 1948, Serial No. 40,026
In Great Britain August 13, 1947

2 Claims. (Cl. 74—334)

This invention has for its primary object to provide improved control mechanisms for variable speed gears as used on road vehicles, machine tools and the like, but the invention may be applied to other uses such as, for example, the selective control of various forms of electric switches, or hydraulic valves.

In the accompanying drawings:

Figure 1 is a sectional side elevation illustrating a portion of a mechanism embodying the invention, and Figure 2 is a plan from which the notched bar shown in the upper portion of Figure 1 is omitted to avoid obscuring of the parts beneath the bar.

Figures 3 and 4 are cross sections respectively showing two positions of the mechanism.

The mechanism shown in the drawings is intended for controlling a three-speed and reverse mechanism of the type used on road vehicles and in which the speed changes are effected by sliding movements imparted to the gear wheels or other component parts. In this mechanism I employ an angularly movable actuating member $a$ in the form of a hollow or solid shaft, this being supported at its ends by appropriate bearings as $b$. In the drawings a part only of this member is shown, as it may be made to any desired length appropriate to the purpose in view. The member $a$ has formed in it two pairs of helical slots or grooves $c$ of convenient pitch and length and situated at any convenient distance apart. One slot or groove in each pair corresponds to a portion of a left-hand helix and the other a right-hand helix. Instead of such slots or grooves any equivalent means may be provided on the said member, such as cam pieces or worm threads. The member $a$ is operable through any convenient angle by a lever $d$ or other mechanism connected to one end of the said member and to any convenient source of motion, such as the clutch pedal or (in some cases) a hand lever.

On the actuating member $a$ are mounted a pair of slidable members $e$ for transmitting motion to the gear members to be actuated. Preferably each such member consists in part of a sleeve which embraces and is slidable on the actuating member, and in part of a fork for engaging a slidable gear member. One of the said slidable members is associated with one of the said pairs of helical slots or grooves or the like, and the other with the other pair.

Parallel with and adjacent to the actuating member is mounted the selecting member $f$. This comprises a rotatable bar adapted for operation manually or otherwise, this bar being arranged to extend through a hole in each of the sleeve parts of the slidable members $e$ and being supported at its ends by bearings as $g$. Also on each of the said slidable members is mounted a pair of plungers $h$ one of which is engageable with one of the adjacent helical slots or grooves and the other with the other slot or groove. Each plunger is connected at its outer end to one end of a leaf spring $i$ which at its other end is secured to the slidable member, and an intermediate part $j$ of the spring is shaped as a pawl to co-operate with the selecting member, the latter having around it at appropriate positions a plurality of differently disposed recesses $k$, one such recess being provided for each spring. Instead of leaf springs, equivalent spring loaded levers may be used.

Further there is arranged over the outer ends of the plungers, a fixed longitudinal bar $m$ which along its lower edge is formed with a pair of notches $n$. Each notch being long enough to subtend a pair of associated plungers and adapted to prevent undesired movement of either of the slidable members. Also the disposition of the notches is such that when any plunger is in action its outer end lies outside its notch and adjacent to or in contact with the under edge of the bar, which thereby prevents accidental movement of this plunger. In this condition the outer end of the adjacent plunger remains in its notch, and the outer ends of both of the other pair of plungers occupy their notch.

When it is required to effect a gear change, the actuating member $a$ is given an angular movement consequent on actuation of the clutch pedal or other operating means. This causes the slidable member previously in action to be moved to the neutral position, and brings the previously operative plunger opposite the associated notch. Appropriate rotation of the selecting member $f$ now raises the said plunger out of engagement with the actuating member, and (according to the amount of angular movement given to this member) allows another of the plungers to engage the said member. The actuating member is then returned to its original position by the return movement of the clutch pedal or operating means, causing an appropriate movement to be given to the slidable member associated with the plunger now in action.

In Figure 1 of the drawings, the right hand slidable member $e$ is shown in its neutral position with the upper ends of its associated plungers occupying the corresponding notch in the bar $m$. The left hand member $e$ is in an operative position with one of its plungers engaging the member $a$ and its upper end lying outside the associated notch. Figure 3 shows a plunger in its inoperative position, with the pawl portion $j$ of the associated spring blade resting on a plain part of the selecting member $f$. Figure 4 shows a plunger in engagement with the member $a$ and the pawl portion $j$ resting in a recess in the selecting member.

When both of the slidable members $e$ are in their neutral positions, the two plungers in each pair occupy their associated notches in the fixed bar $m$, and both members are thereby held against accidental movement. When either plunger of either pair is in action its outer end is held against accidental movement by the said bar.

The invention is not, however, limited to the particular example above described. Thus, each plunger may have combined with it a leaf spring or spring loaded lever tending to disengage the plunger from the actuating member. In this case the selecting member is adapted to move the plunger in opposition to the said action. Also when the plungers are carried by leaf springs as above described, the required gear changes can be pre-selected, as the springs will yield under the action of the selecting member, even when the plungers are held against movement by the fixed bar. When, however, the plungers are carried by rigid levers, the plungers, or the parts co-operating with the selecting member, may be movably mounted and spring loaded on the levers, to enable the pre-selection to be effected if required. Further, any desired number of slidable members may be used, and other subordinate details may be varied to suit different requirements. Moreover, whilst the invention is primarily intended for controlling variable speed gears for road vehicles, machine tools or the like, it may be applied to other uses, such as the control of electrical switch gear, hydraulic valves or the like containing parts requiring to be selectively operated.

Having thus described my invention what I claim as new and desire to secure by Letters Patent is:

1. A control mechanism for variable speed gears or other purposes, and comprising the combination of an angularly movable actuating shaft, at least one slidable member carried by the actuating shaft, a pair of plungers carried by the slidable member, helically disposed means on the actuating shaft engageable by the plungers and adapted to impart opposite movements to the slidable member through the medium of the plungers, an angularly movable selecting bar arranged parallel with the actuating shaft, spring means through which the plungers are operable by the selecting bar, and means engageable by the plungers for preventing undesired movements of the slidable member.

2. A control mechanism for variable speed gears or other purposes, and comprising the combination of an angularly movable actuating shaft, at least one slidable member carried by the actuating shaft, a pair of plungers carried by the slidable member, helically disposed means on the actuating shaft engageable by the plungers and adapted to impart opposite movements to the slidable member through the medium of the plungers, an angularly movable selecting bar arranged parallel with the actuating shaft, leaf springs through which the plungers are carried by the slidable member and operable by the selecting bar, and means engageable by the plungers for preventing undesired movements of the slidable member.

HENRY MARTIN KESTERTON.

REFERENCES CITED

The following references are of record in the file of this patent:

UNITED STATES PATENTS

| Number | Name | Date |
|---|---|---|
| 1,283,561 | Richardson | Nov. 5, 1918 |
| 1,982,976 | Alltree | Dec. 4, 1934 |

FOREIGN PATENTS

| Number | Country | Date |
|---|---|---|
| 459,556 | Great Britain | Jan. 11, 1937 |